United States Patent
Hinds et al.

(10) Patent No.: US 11,368,458 B2
(45) Date of Patent: Jun. 21, 2022

(54) METHODS AND SYSTEMS FOR VERIFYING A SOURCE OF A MESSAGE OR CALL

(71) Applicant: Arm IP Limited, Cambridge (GB)

(72) Inventors: Christopher Neal Hinds, Austin, TX (US); David Raymond Lutz, Austin, TX (US)

(73) Assignee: Arm IP Limited, Cambridge (GB)

( * ) Notice: Subject to any disclaimer, the term of this patent is extended or adjusted under 35 U.S.C. 154(b) by 210 days.

(21) Appl. No.: 16/144,826

(22) Filed: Sep. 27, 2018

(65) Prior Publication Data

US 2020/0153826 A1 May 14, 2020

(51) Int. Cl.
*H04L 9/40* (2022.01)

(52) U.S. Cl.
CPC ........ *H04L 63/0876* (2013.01); *H04L 63/108* (2013.01)

(58) Field of Classification Search
CPC .......................... H04L 63/0876; H04L 63/108
See application file for complete search history.

(56) References Cited

U.S. PATENT DOCUMENTS

| | | | | |
|---|---|---|---|---|
| 2006/0015725 | A1* | 1/2006 | Voice | H04L 9/3273 713/168 |
| 2006/0206709 | A1* | 9/2006 | Labrou | G06Q 20/32 713/167 |
| 2009/0016524 | A1* | 1/2009 | Park | H04L 9/0872 380/44 |
| 2011/0107098 | A1* | 5/2011 | Hong | H04L 45/00 713/168 |
| 2014/0281534 | A1* | 9/2014 | McCormack | H04L 63/0428 713/168 |
| 2014/0282873 | A1* | 9/2014 | Struik | H04L 9/00 726/3 |
| 2015/0249663 | A1* | 9/2015 | Svigals | H04W 12/08 726/7 |
| 2016/0065592 | A1* | 3/2016 | Svigals | H04L 63/0838 726/3 |
| 2016/0255083 | A1* | 9/2016 | Svigals | H04L 9/3228 726/4 |
| 2016/0381015 | A1* | 12/2016 | Ravinutala | H04L 63/0272 726/7 |
| 2017/0238177 | A1 | 8/2017 | Lee | |
| 2017/0373855 | A1* | 12/2017 | Pritchard | H04L 9/0643 |
| 2018/0026799 | A1* | 1/2018 | Pottier | H04L 9/30 713/156 |
| 2019/0199735 | A1* | 6/2019 | Gosla | H04L 63/1441 |

OTHER PUBLICATIONS

Kumari, et al; An Improved Timestamp-Based Password Authentication Scheme: Comments, Cryptanalysis, and Improvement; Security Comm. Networks 2014; pp. 1921-1932; Johsn Wiley & Sons, Ltd.; Nov. 13, 2013.

* cited by examiner

*Primary Examiner* — Yonas A Bayou
(74) *Attorney, Agent, or Firm* — Pramudji Law Group PLLC; Ari Pramudji (57) ABSTRACT

Various implementations described herein are directed to providing time-dependent authentication of a sending device. A message to a designated receiver is prepared. A portion of at least one secret identifier value of the sending device is retrieved. A portion of time information is retrieved. An authentication field is produced using the portion of the at least one secret identifier value and the portion of the time information. The authentication field is attached to the message. The message is transmitted to the designated receiver.

20 Claims, 11 Drawing Sheets

METHODS AND SYSTEMS FOR VERIFYING A SOURCE OF A MESSAGE OR CALL

BACKGROUND

Messages and calls placed in mobile communication networks and other computer-based networks are subject to various types of vulnerabilities and cryptographic attacks. One example of vulnerability includes the ability for network programmers to change caller identification information for a phone sending a message or placing a call. Examples of cryptographic attacks include message spoofing and man-in-the-middle attacks. Effective cryptographic measures are necessary to prevent data loss and to secure sensitive information.

BRIEF DESCRIPTION OF THE DRAWINGS

Implementations of various techniques are described herein with reference to the accompanying drawings. It should be understood, however, that the accompanying drawings illustrate only the various implementations described herein and are not meant to limit the scope of various techniques described herein.

DETAILED DESCRIPTION

Figure 1:
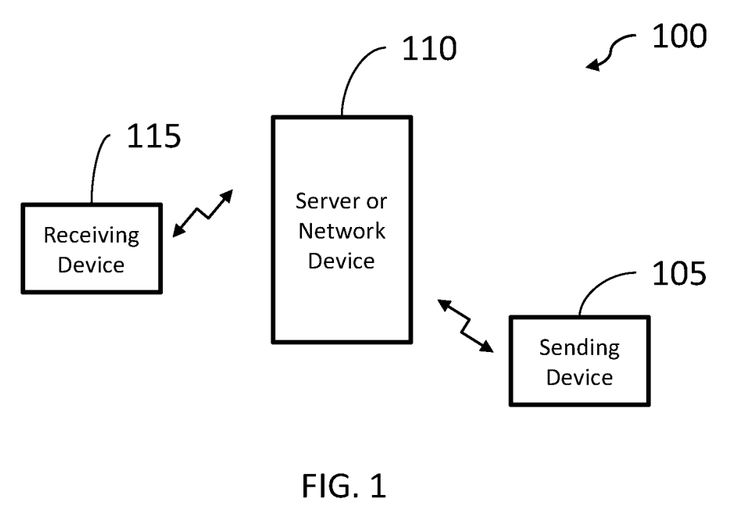
FIG. 1 illustrates an example system for providing an authentication indication in accordance with implementations of various techniques described herein.

FIG. 1 illustrates a system for providing an authentication indication. System 100 includes a sending device 105, a server or network device 110 and a receiving device 115. Sending device 105 may have associated unique identification information. At least a portion of the associated unique identification information and a time stamp from a time generator associated with the sending device 105 may be provided to a hash function of the sending device 105. The output of this hash function may be provided to server or network device 110.

The server or network device 110 receives the unique identification information of the sending device 105 and the output of the hash function of the sending device 105. At least a portion of the received unique identification information and time information from a time generator associated with the server or network device 110 is provided to a hash function of the server or network device 110. The output of the hash function of the sending device 105 is compared to the output of the hash function of the server or network device 110. If the output of the hash functions match, the server or network device 110 provides an authentication indication based on the comparison. Due to the use of time information, the authentication indication can be considered to be a time-dependent authentication indication. This time-dependent authentication indication may be used to alert a user of the receiving device 115 that the information has been received from a valid sending device and the information has not been spoofed or subject to a man-in-the-middle attack.

System 100 can be configured to create a unique encrypted function that applies a hash function to at least all or a portion of the unique identification information and all or a portion of the time information. The hash value is used to create a unique key for that single session.

In one implementation, the whole packet can be hashed with the time generator. In this implementation, the message, at least a portion of one or more unique identifiers and the time information can be hashed.

In one implementation, the time generator may be operable to generate time information sufficiently precise enough to enable a receiving device to verify an authentication field, e.g., an output of a hash function of a sending device, in the event the time of the time generator and the time of the receiving device are not identical. Time generators may have differing time values or differing precisions. Transmission delays may also be present in the network. A portion of each time generator value may be used to ensure that the hash values match when the time generators are within particular tolerances and the transmission delay is not greater than a particular threshold. In one implementation, a range of acceptable hash values can be determined based on the accuracy of the time generators present within sending device 105 and server or network device 110. The range of acceptable hash values can be determined using a time window having a predetermined range, i.e., a maximum threshold and a minimum threshold.

Figure 2:
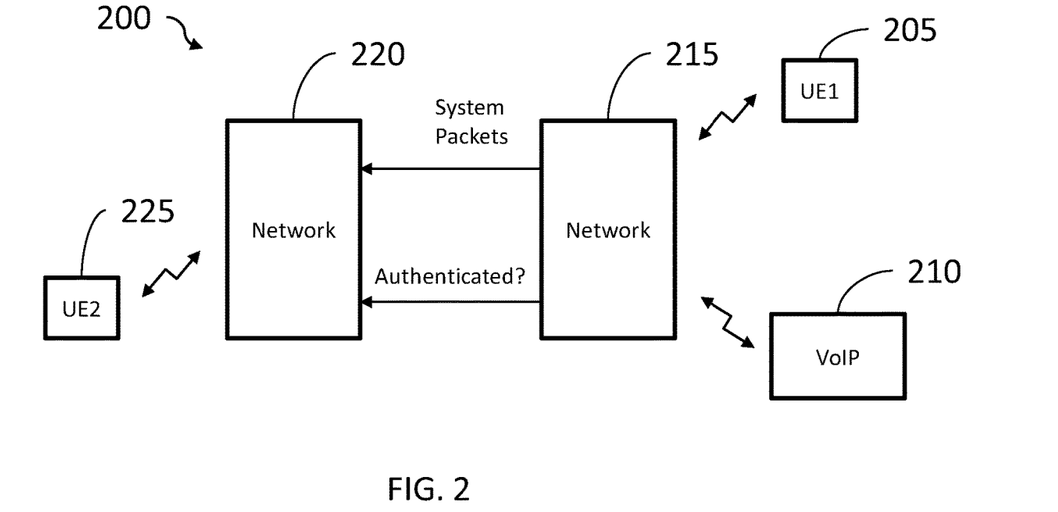
FIG. 2 illustrates an example communication system incorporating wireless communication and voice over internet protocol (VOIP) communication capable of providing an authentication indication in accordance with implementations of various techniques described herein.
Figure 3:
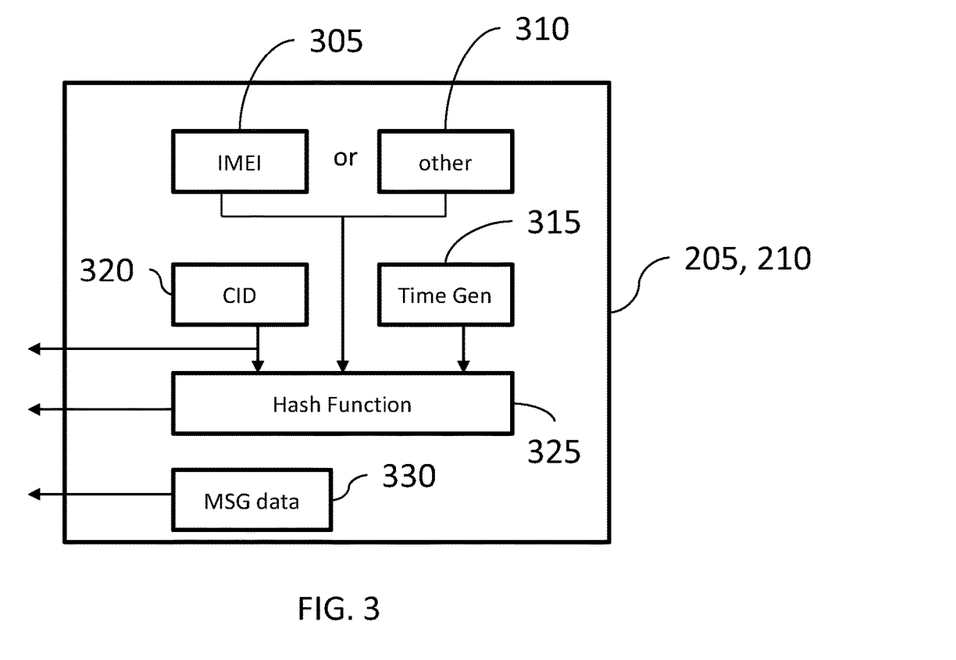
FIG. 3 illustrates an example communication system incorporating wireless communication and voice over internet protocol (VOIP) communication capable of providing an authentication in accordance with implementations of various techniques described herein.
Figure 4:
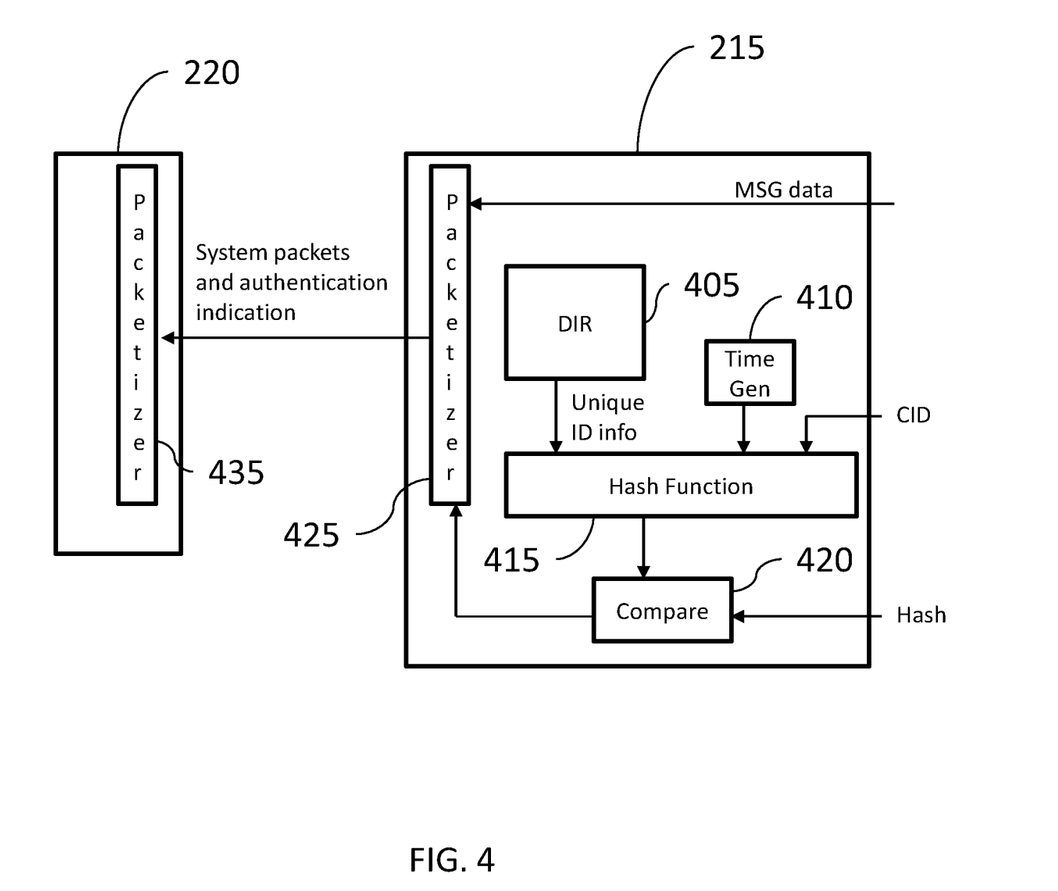
FIG. 4 illustrates an example communication system incorporating wireless communication and voice over internet protocol (VOIP) communication capable of providing an authentication indication in accordance with implementations of various techniques described herein.

FIG. 2, FIG. 3 and FIG. 4 illustrate an example communication system 200 incorporating wireless communication and voice over internet protocol (VOIP) communication capable of providing an authentication indication. FIG. 2 includes a first user entity 205, a VoIP device 210, a first network device 215, a second network device 220 and a second user entity 225. Communication system 200 may be configured to be applied to any packet-based mobile network and/or VoIP network.

Each user equipment (UE) device 205, 225 has one or more unique identifiers 305, 310, e.g., international mobile equipment identity (IMEI), indoor messaging system (IMES) identifier, electronic serial number (ESN), and mobile equipment identifier (MEID). The one or more unique identifiers are known to one or more network device(s) 215, 220. Each UE 205, 225 may also include a time generator 315. Time generator 315 is configured to generate time information, e.g., a time stamp, a portion of a time stamp, or some other form of time indication. A hash function 325 generates a hash value based at least on a portion of the unique identifier(s) 305, 310, a caller identification (CID) number 320, and time information from time generator 315. The generated hash value is sent to the network device 215 along with packetized data, e.g., MSG data 330, from the UE 205 and CID information 320.

Likewise, VoIP device 210 has at least one unique identifier 310 known to one or more network device(s) 215, 220. VoIP device 210 may also generate a hash value based on at least of portion of unique identifier 310, a CID 320, and time information from time generator 315. The hash value generated by hash function 325 may be sent to the network device 215 along with packetized data, e.g., MSG data 330, from VoIP device 210 and CID information 320.

One or more network devices 215, 220 are able to determine the unique identifier(s) of every device on network 200 using directory 405. When a connection is made between network device 215 and UE 205 or VoIP device 210, the network device 215 that handles the connection is able to verify that the network device 215 is communicating with the actual originating device 205, 210. This verification by the network device 215 is made possible by applying a hash function 415 to at least a portion of the unique identifier information from directory 405, the CID information received from UE 205 or VoIP device 210, and at least a portion of the time generation information from local time generator 410. Like time generator 315, local time generator 410 is configured to generate time information, e.g., a time stamp, a portion of a time stamp, or some other form of time indication. The CID information alone is not hashed with the time generation information because this information can be spoofed or subject to a man-in-the-middle attack. At element 420, an output of hash function 415 is compared to hash value information received from the sending device 105, 205, 210. The output of element 420 provides an indication of whether or not the sending device 105, 205, 210 is a certified device.

Once the packet-based message 330 is decrypted by network device 215, the packets are sent through the network via packetizer 425 with an authentication indication that indicates whether the sending device 105, 205, 210 is a certified device. Providing the authentication indication provides a user of a receiving device 115, 225 an indication that the received CID information has been certified and the sending device 105, 205, 210 been authenticated. The packets including the authentication indication may be sent directly to receiving device 115 from network device 110 as shown in FIG. 1. The packets including the authentication indication may also be sent to UE 225 via packetizer 435 of network device 220. Although not shown, the packets including the authentication indication may traverse one or more intermediate network devices between network device 215 and network device 220.

The receiving device 115, 225 receives an authentication indication from the network device 110, 220. Options for handling the call based on the authentication indication may be provided by the network device 110, 220 or may be provided in the receiving device 115, 225. For example, a user using the receiving device 115, 225 may choose whether or not to answer a call based on whether or not a received authentication indication shows that a CID has been authenticated. In some instances, the receiving device 115, 225 may not receive an authentication indication showing that a CID has been validated when, for example, the call has been received through a network that does not support the authentication indication capability. In other instances, an authentication indication may not show a validated CID when the call has been spoofed.

Providing an authentication indication in the manner described hinders spoofing and man-in-the-middle attacks. By the time an attacker is able to decrypt information and attempt a spoofing or man-in-the-middle attack, the time generation portion of the hash function would have already proceeded and any attempt to send spoofed information would be determined, e.g., by element 420 of network device 215, to be invalid.

Figure 5:
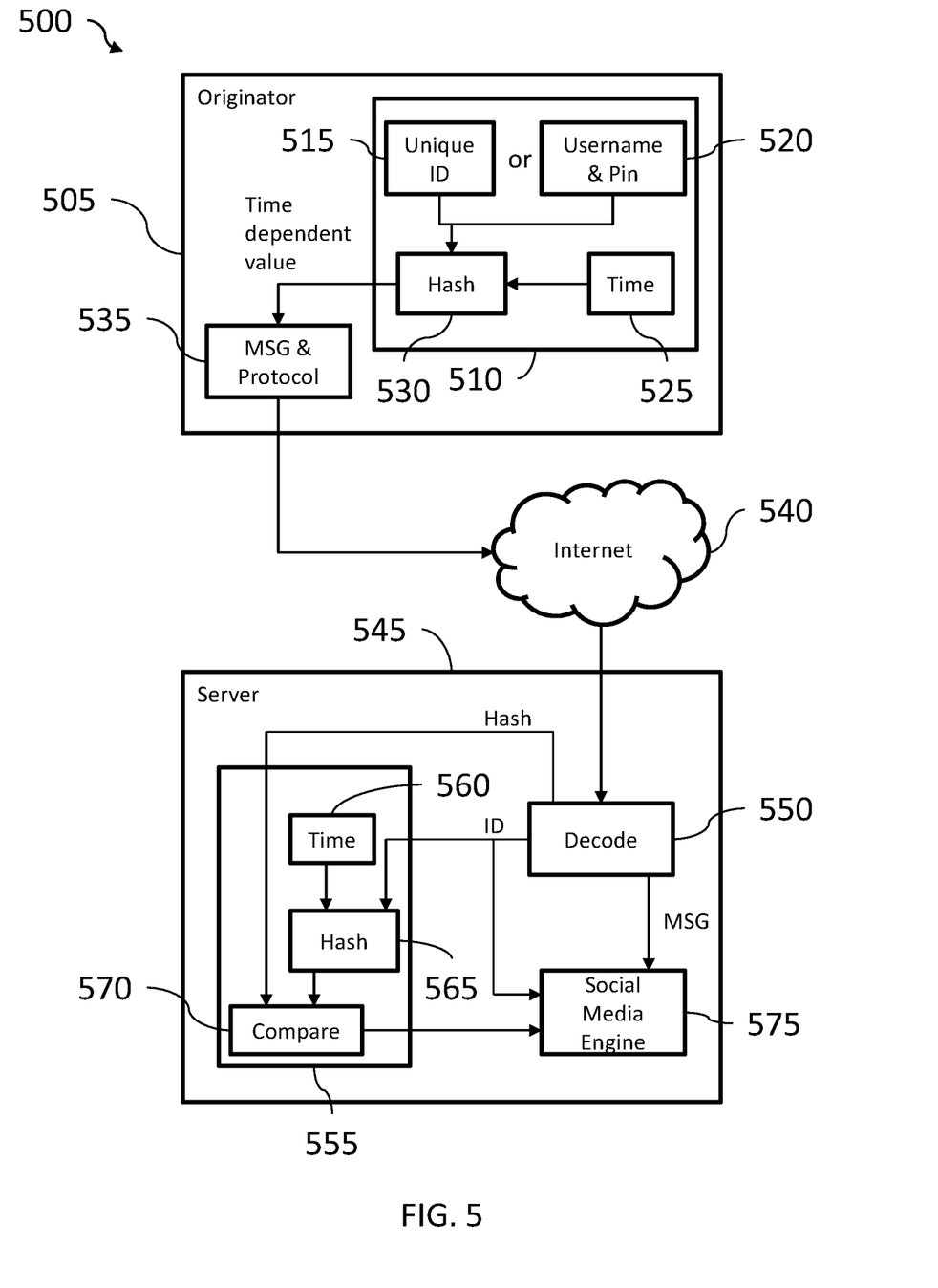
FIG. 5 illustrates an example social media system in accordance with implementations of various techniques described herein.

FIG. 5 illustrates an example social media system 500. Social media system 500 includes an originator device 505 communicating with a server 545 over the Internet 540. Originator 505 includes time-dependent authentication module 510. Time-dependent authentication module 510 includes a hash function 530 that receives at least a portion of a unique ID 515 and/or at least a portion of a username and password as input. In addition, the hash function 530 receives time information generated from time generator 525. As described above, time generator 525 is configured to generate time information, e.g., a time stamp, a portion of a time stamp, or some other form of time indication. Hash function 530 determines a time-dependent hash value and provides this time-dependent hash value to element 535. Element 535 is configured to add the time-dependent hash value to packets transporting a message over the Internet 540 to server 545 in accordance with a selected transmission protocol. Server 545 decodes, using decoder 550, the received packets to extract the message, the unique ID and/or username and password information, and the hash determined by hash function 530. Hash comparison module 555 determines a second time-dependent hash value, using hash function 565, from time information generated by time generator 560 and at least a portion of the unique ID and/or at least a portion of the username and password information received from decoder 550. The second time-dependent hash value is compared to the time-dependent hash value (received via hash function 530 and decoder 550) using comparison module 570. Packets that include encrypted time information can be used by the social media engine 575 to prevent others from spoofing messages and/or posting messages in place of a valid user.

Figure 6:
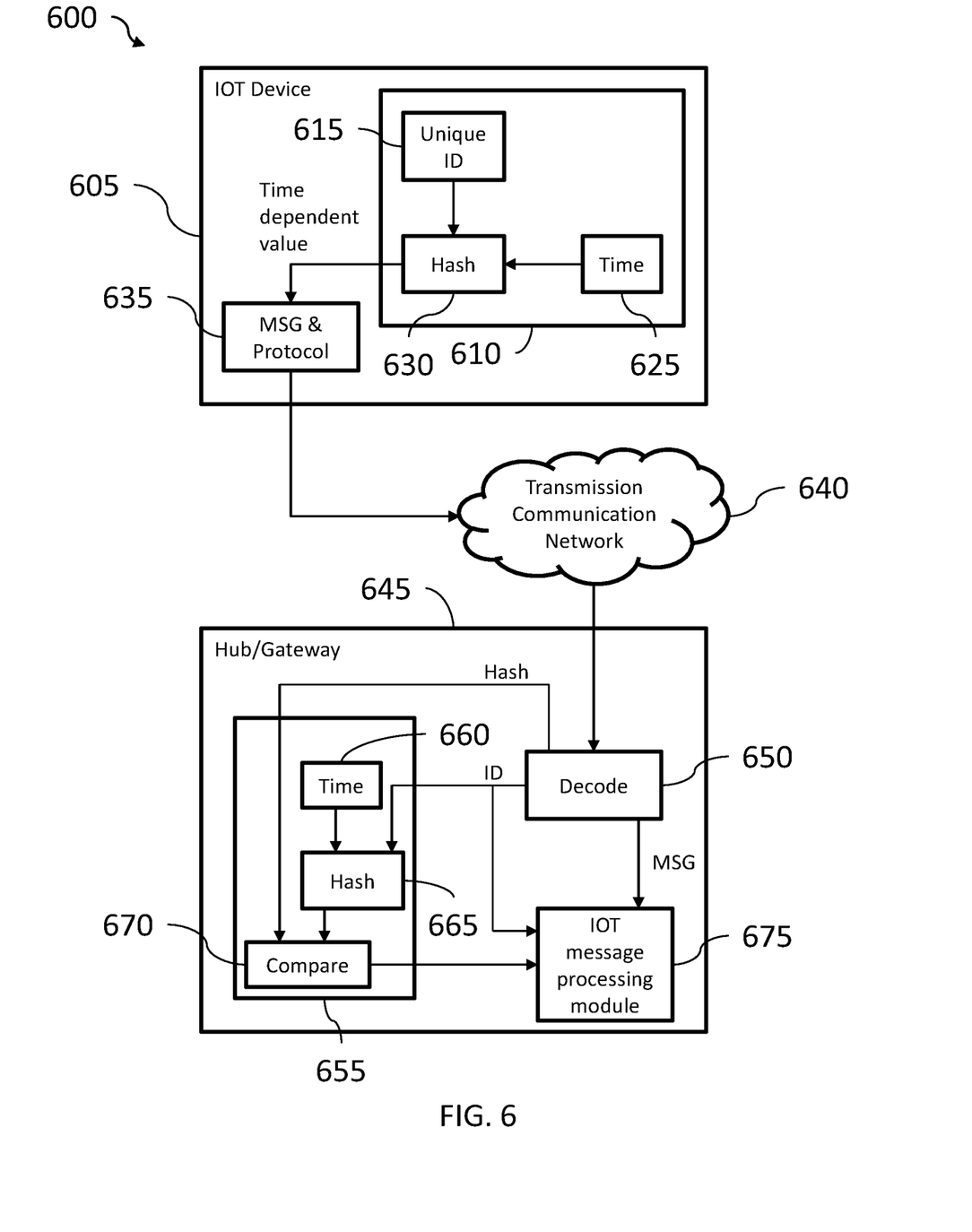
FIG. 6 illustrates an example internet of things (IOT) system in accordance with implementations of various techniques described herein.

FIG. 6 illustrates an example internet of things (IOT) system 600. IOT system 600 includes an IOT device 605 communicating with a remote device 645 over a transmission communication network 640. Remote device 645 may also be referred to as a hub or gateway. IOT device 605 includes time-dependent authentication module 610. Time-dependent authentication module 610 includes a hash function 630 that receives at least a portion of a unique ID 615 and time information generated from time generator 625 as input.

Time generator 625 is configured to generate time information, e.g., a time stamp, a portion of a time stamp, or some other form of time indication. Time generator 625 of IOT device 605 may be an accurate time generator or may be a time generator that can be updated at regular time intervals by a server or the remote device 645.

In one implementation, the unique ID is determined during a registration process of the IOT device. The unique ID allows a server or remote device 645 to interact with the IOT device 605. In one implementation, the unique ID is embedded and hard coded into IOT device 605. In another implementation, the unique ID is written in by a cloud server or the owner of the IOT device 605.

Hash function 630 determines a time-dependent hash value and provides this time-dependent hash value to element 635. Element 635 is configured to add the time-dependent hash value to packets transporting a message over the transmission communication network 640 to remote device 645 in accordance with a selected transmission protocol. The selected transmission protocol may include a local area network (LAN), Bluetooth®, a wide area network (WAN), Z-Wave®, Zigbee®, Wi-Fi®, or any other transmission communication network protocol. Remote device 645 decodes, using decoder 650, the received packets to extract the message, the unique ID, and the hash determined by hash function 630. Hash comparison module 655 determines a second time-dependent hash value, using hash function 665, from time information generated by time generator 660 and at least a portion of the unique ID received from decoder 650. The second time-dependent hash value is compared to the time-dependent hash value (received via hash function 630 and decoder 650) using comparison module 670. Packets that include time-dependent authentication information can be used by the IOT message processing module 675 to verify that a message was sent by an IOT device. A received message that does not include time-dependent authentication information will either prompt a request for retransmission or be ignored. Providing time-dependent authentication information in this manner provides a lower cost authentication option when compared to existing authentication protocols for IOT devices.

Figure 7:
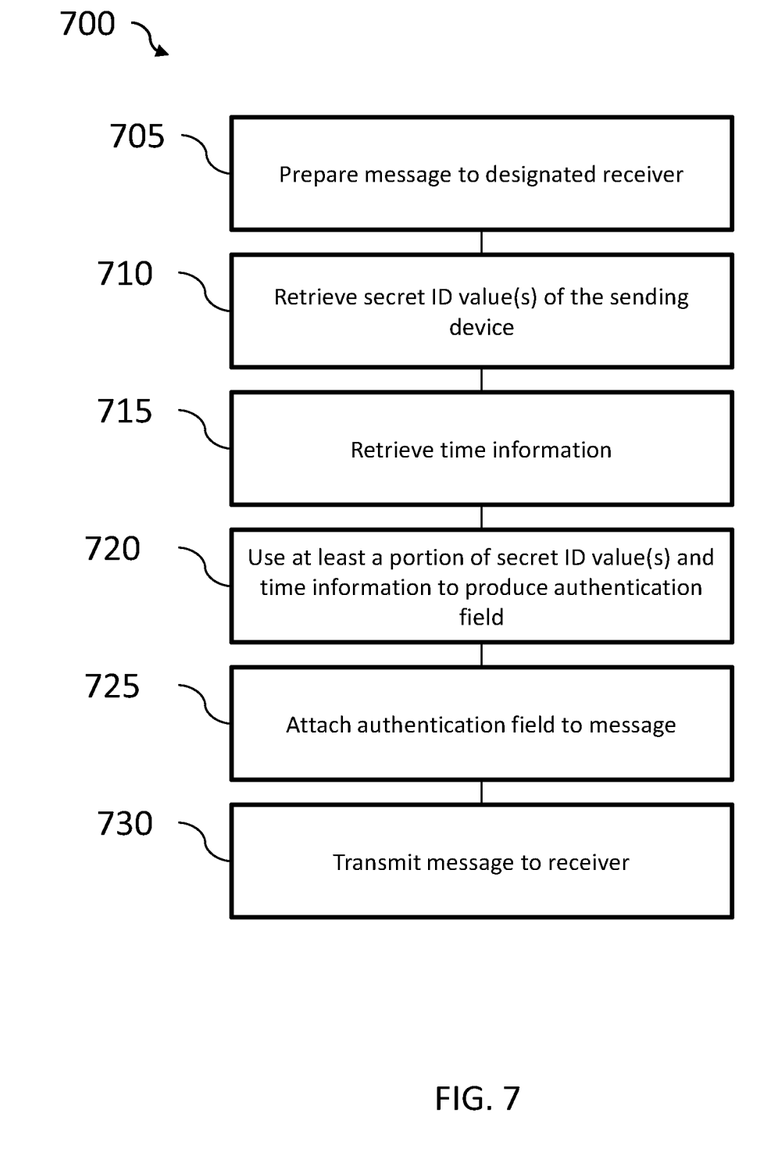
FIG. 7 illustrates a diagram of a method for providing a time-dependent authentication in accordance with implementations of various techniques described herein.

FIG. 7 illustrates a diagram of a method 700 for providing a time-dependent authentication. At block 705, a message is prepared for a designated receiver, e.g., server or network device 110, 215, 545, 645. At block 710, one or more secret ID values of the sending device, e.g., sending device 105, 205, 210, 505, 605, are retrieved. At block 715, time information is retrieved. At block 720, at least a portion of the one or more secret ID values and time information are used to produce an authentication field, e.g., a hash value or time-dependent hash value as previously described. At block 725, the authentication field is incorporated into, e.g., attached to or included within, the message. At block 730, the message is transmitted to the designated receiver.

Figure 8:
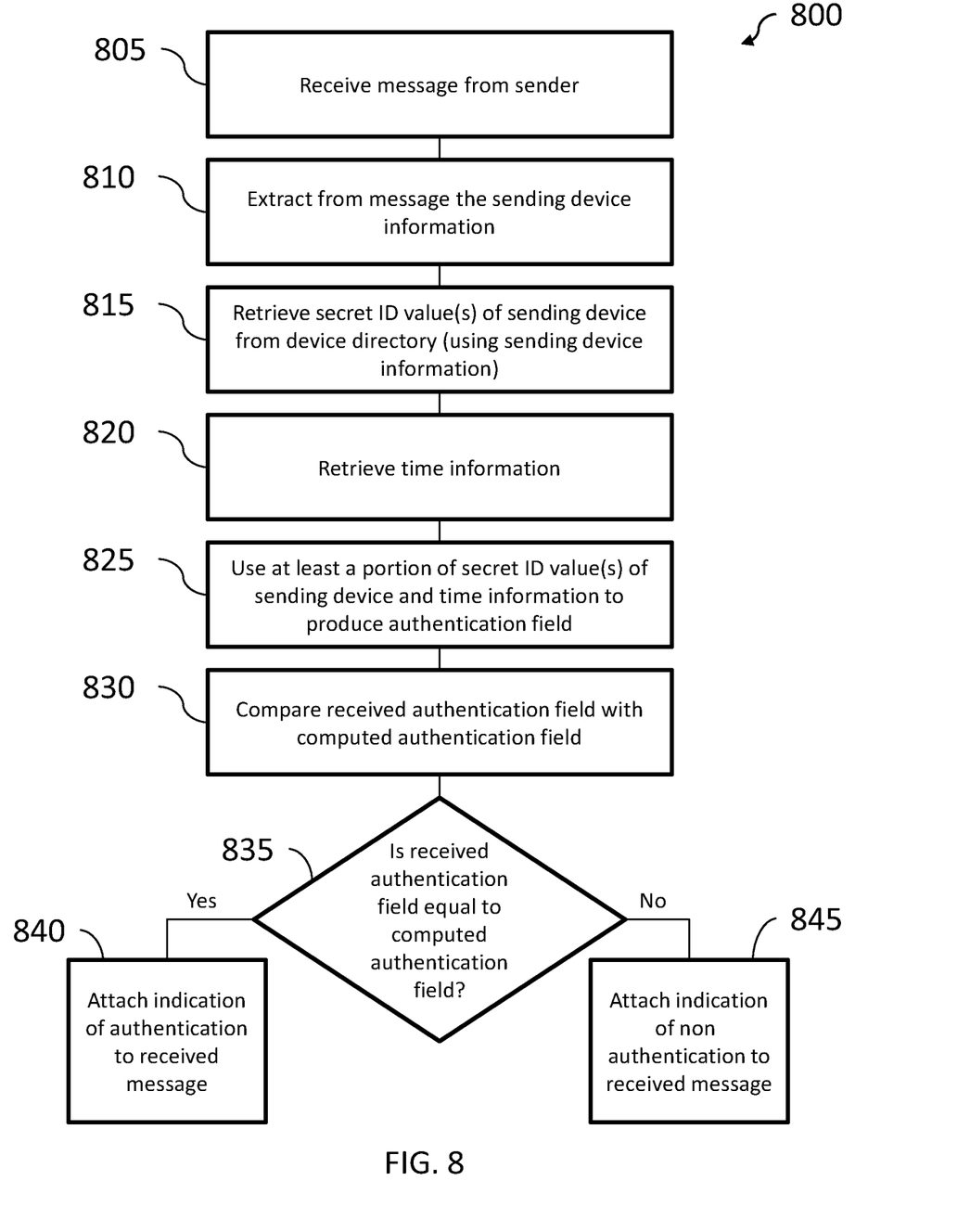
FIG. 8 illustrates a diagram of a method for providing a time-dependent authentication in accordance with implementations of various techniques described herein.

FIG. 8 illustrates a diagram of a method 800 for providing time-dependent authentication. At block 805, a message is received, e.g., by server or network device 110, 215, 545, 645 from a sender, e.g., sending device 105, 205, 210, 505, 605. At block 810, the sending device information is extracted from the message. At block 815, secret ID value(s) of sending device are retrieved from a device directory. In one implementation, the secret ID value(s) are retrieved from the device directory using the sending device information. At block 820 time information is retrieved. At block 825, at least a portion of the one or more secret ID value(s) of the sending device and time information are used to determine an authentication field. At block 830, the received authentication field is compared with the determined authentication field. At determination is made at block 835 as to whether the received authentication field is equal to the determined authentication field. If the received authentication field is equal to the determined authentication field, an indication of authentication is attached to the received message at block 840. If the received authentication field is not equal to the determined authentication field, an indication of non-authentication is attached to the received message at block 845.

Figure 9:
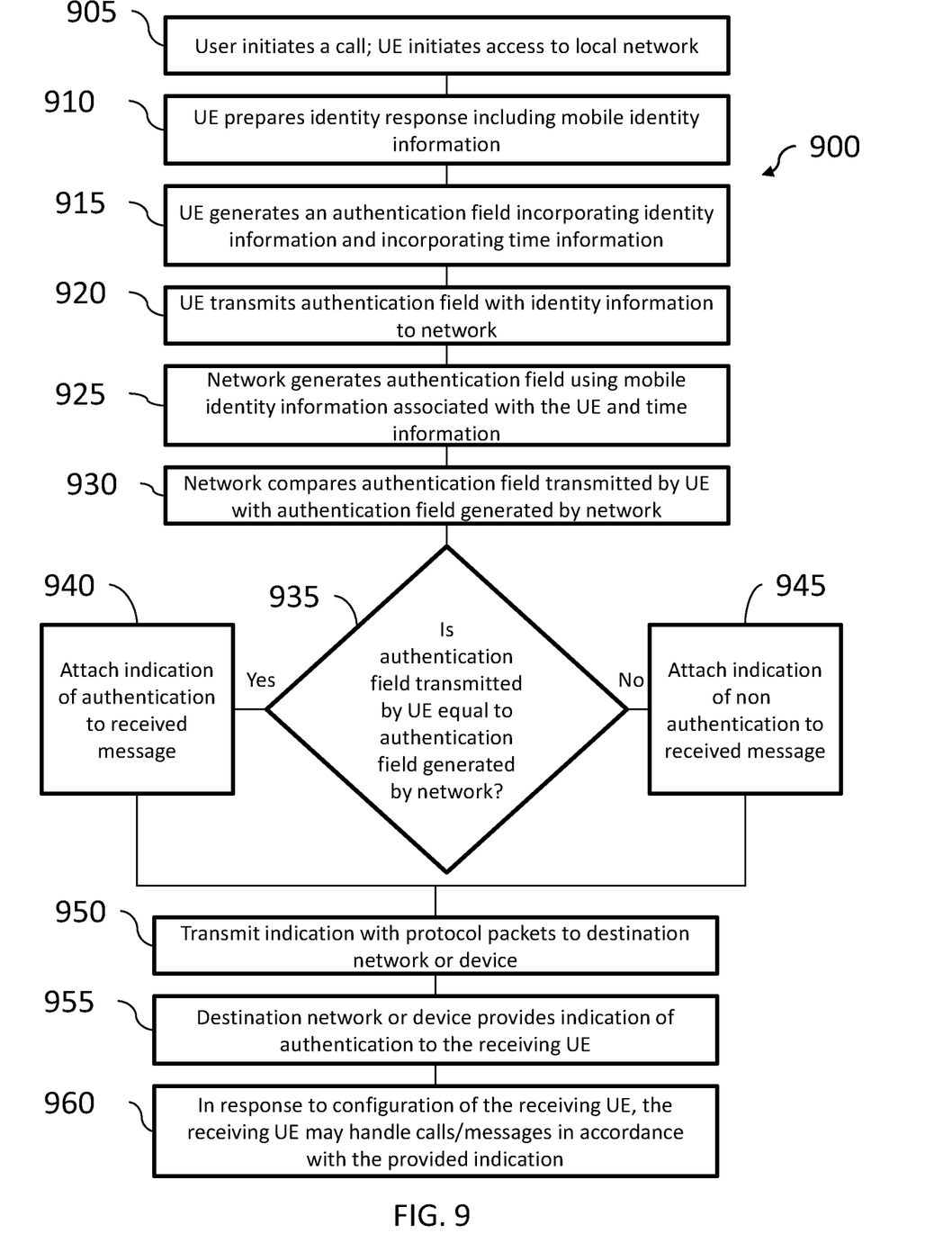
FIG. 9 illustrates a diagram of a method for providing time-dependent authentication in a mobile device and/or VoIP system in accordance with implementations of various techniques described herein.

FIG. 9 illustrates a diagram of a method 900 for providing time-dependent authentication in a mobile device and/or VoIP system, e.g., system 200. At block 905, a user initiates a call. The UE initiates access to a local network. At block 910, the UE prepares an identity response including mobile identity information. At block 915, the UE generates an authentication field incorporating identity information and incorporating time information. At block 920, the UE transmits the authentication field with the identity information to the network. At block 925, the network generates an authentication field using mobile identity information associated with the UE and time information. At block 930, the network compares the authentication field transmitted by the UE with the authentication field generated by the network. At block 935 a determination is made as to whether the authentication field transmitted by the UE is equal to the authentication field generated by the network. If the authentication field transmitted by the UE is equal to the authentication field generated by the network, an indication of authentication is attached to the received message at block 940. If the authentication field transmitted by the UE is not equal to the authentication field generated by the network, an indication of non-authentication is attached to the received message at block 945. At block 950, the indication (of authentication or non-authentication) is transmitted with protocol packets to a destination network or device. At block 955, the destination network or device provides the indication to the receiving UE. At block 960, the UE can be configured to handle calls/messages in accordance with the provided indication (of authentication or non-authentication). In one implementation, the receiving UE may reject a call if the indication of authentication indicates the incoming call is not authenticated by the network. In one implementation, the receiving UE may cause the incoming call to be directed to voice mail and not alert the user of the UE. In one implementation, the UE may provide an alert to the user of the UE that an incoming message/call includes an indication of authentication.

Figure 10:
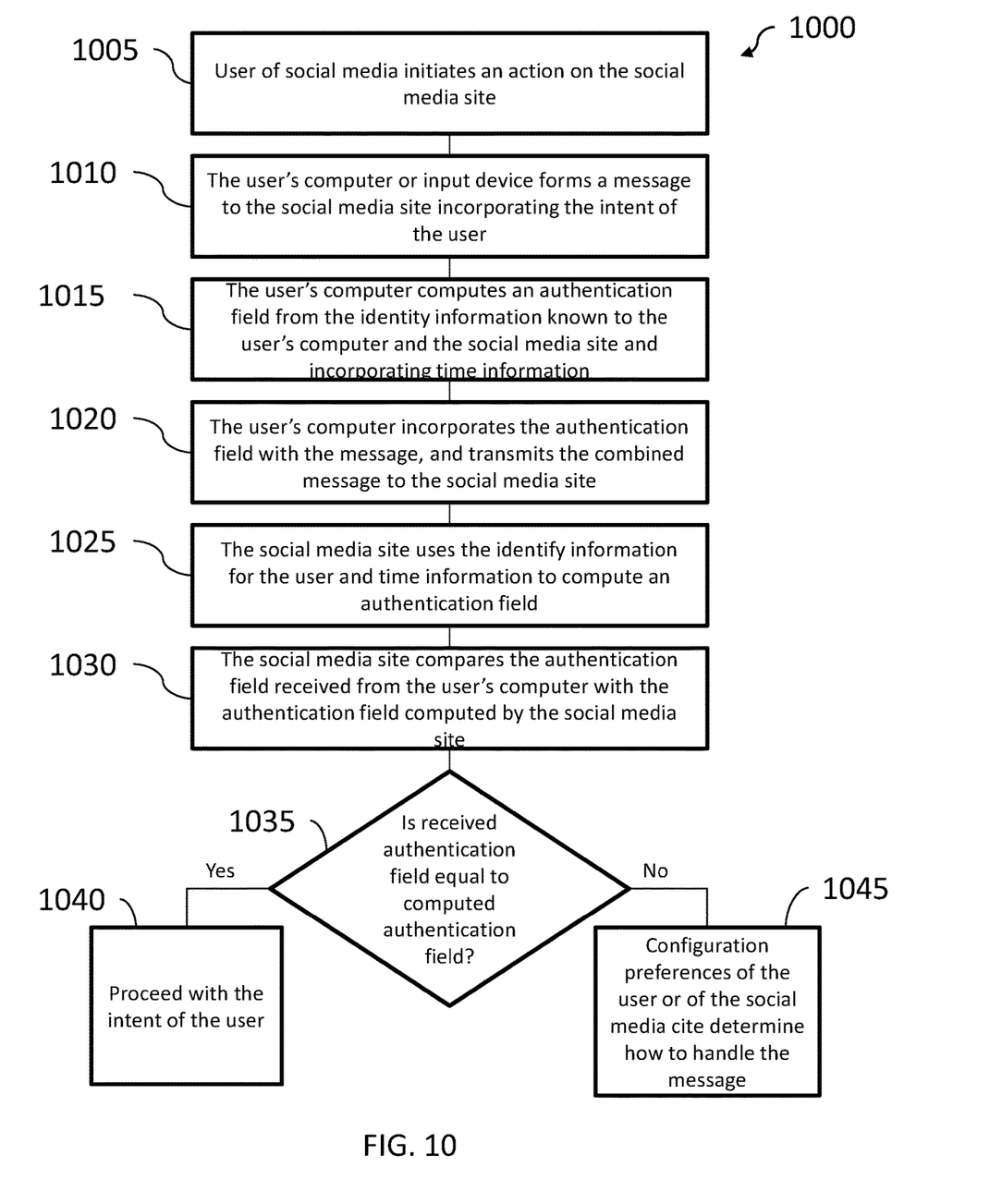
FIG. 10 illustrates a diagram of a method for providing time-dependent authentication in a social media system in accordance with implementations of various techniques described herein.

FIG. 10 illustrates a diagram of a method 1000 for providing time-dependent authentication in a social media system, e.g., system 500. At block 1005, a user of social media initiates an action on the social media site. At block 1010, the user's computer or input device forms a message to the social media site incorporating an intent of the user. At block 1015, the user's computer computes an authentication field from identity information known to the user's computer and the social media site and further incorporates time information. At block 1020, the user's computer incorporates the authentication field with the message, and transmits the combined message to the social media site. At block 1025, the social media site uses the identity information for the user and time information to compute an authentication field. At block 1030, the social media site compares the authentication field received from the user's computer with the authentication field computed by the social media site. At block 1035, a determination is made as to whether the received authentication field is equal to the computed authentication field. If the received authentication field is equal to the computed authentication field, the social media site proceeds with the intent of the user at block 1040. If the received authentication field is not equal to the computed authentication field, configuration preferences of the user or of the social media site determine how to handle the message(s) at block 1045. In one implementation, the configuration preferences proceed with the intent of the user. In another implementation, the configuration preferences reject the incoming message. In a further implementation, the incoming message can be recorded and an indication of the rejection of the message may be provided to the social media user.

Figure 11:
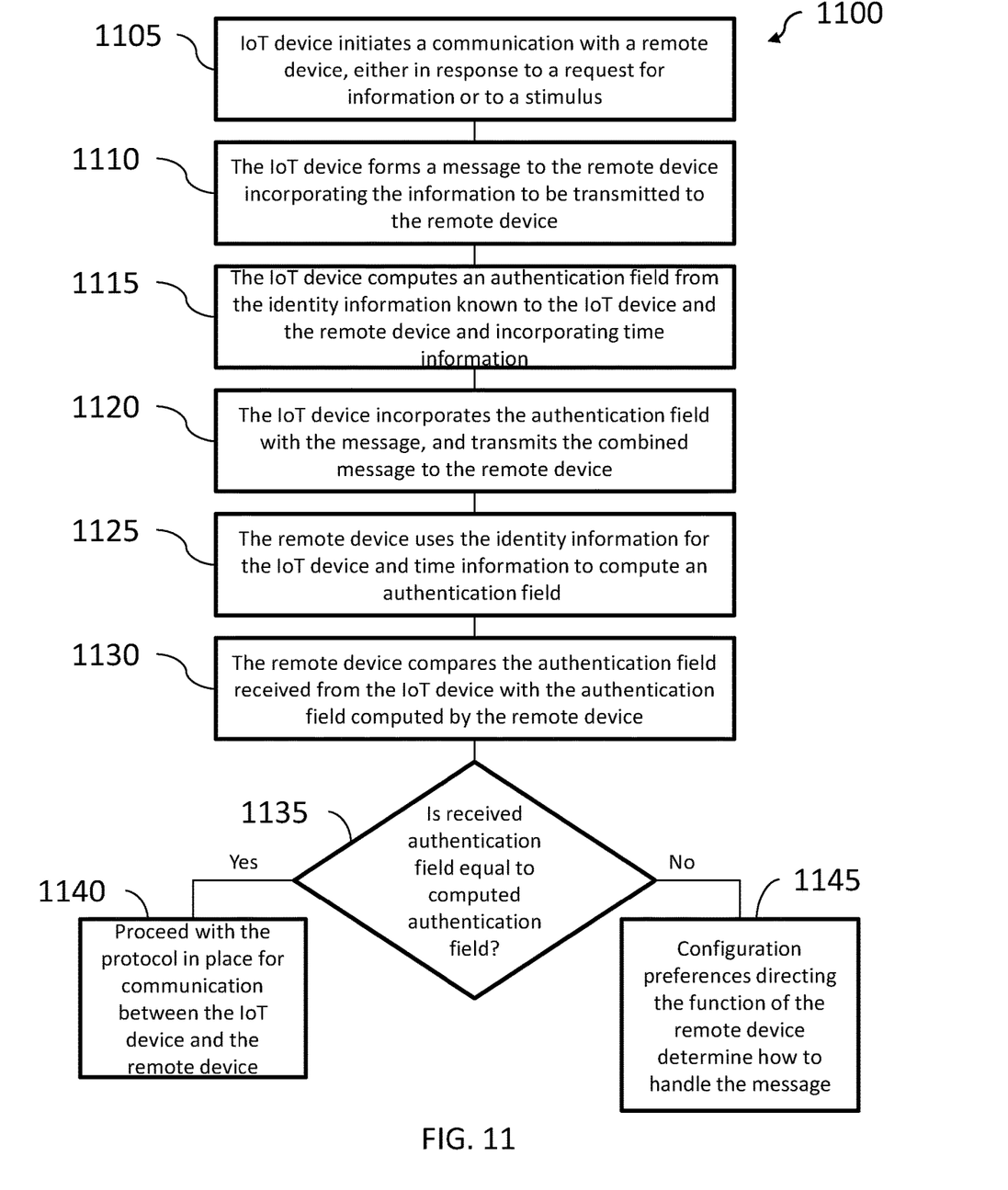
FIG. 11 illustrates a diagram of a method for providing time-dependent authentication for IoT communication in accordance with implementations of various techniques described herein.

FIG. 11 illustrates a diagram of a method 1100 for providing time-dependent authentication for IoT communication, e.g., in system 600. At block 1105, an IoT device initiates a communication with a remote device. The communication with the remote device may be initiated in response to a request for information or in response to a stimulus. At block 1110, the IoT device forms a message to the remote device incorporating information to be transmitted to the remote device. At block 1115, the IoT device computes an authentication field from identity information known to the IoT device and the remote device and further incorporates time information. At block 1120, the IoT device incorporates the authentication field with the message, and transmits the combined message to the remote device. At block 1125, the remote device uses the identity information for the IoT device and time information to compute an authentication field. At block 1130, the remote device compares the authentication field received from the IoT device with the authentication field computed by the remote device. At block 1135, a determination is made as to whether the received authentication field is equal to the computed authentication field. If the received authentication field is equal to the computed authentication field, the remote device proceeds with the protocol in place for communication between the IoT device and the remote device at block 1140. If the received authentication field is not equal to the computed authentication field, configuration preferences directing the function of the remote device determine how to handle the message(s) at block 1145. In one implementation, the configuration preferences accept the message as authentic and proceed with the protocol in place for communication between the IoT device and the remote device. In another implementation, the configuration preferences reject the incoming message. In a further implementation, the incoming message can be recorded and an indication of the rejection of the message may be provided.

Figure 12:
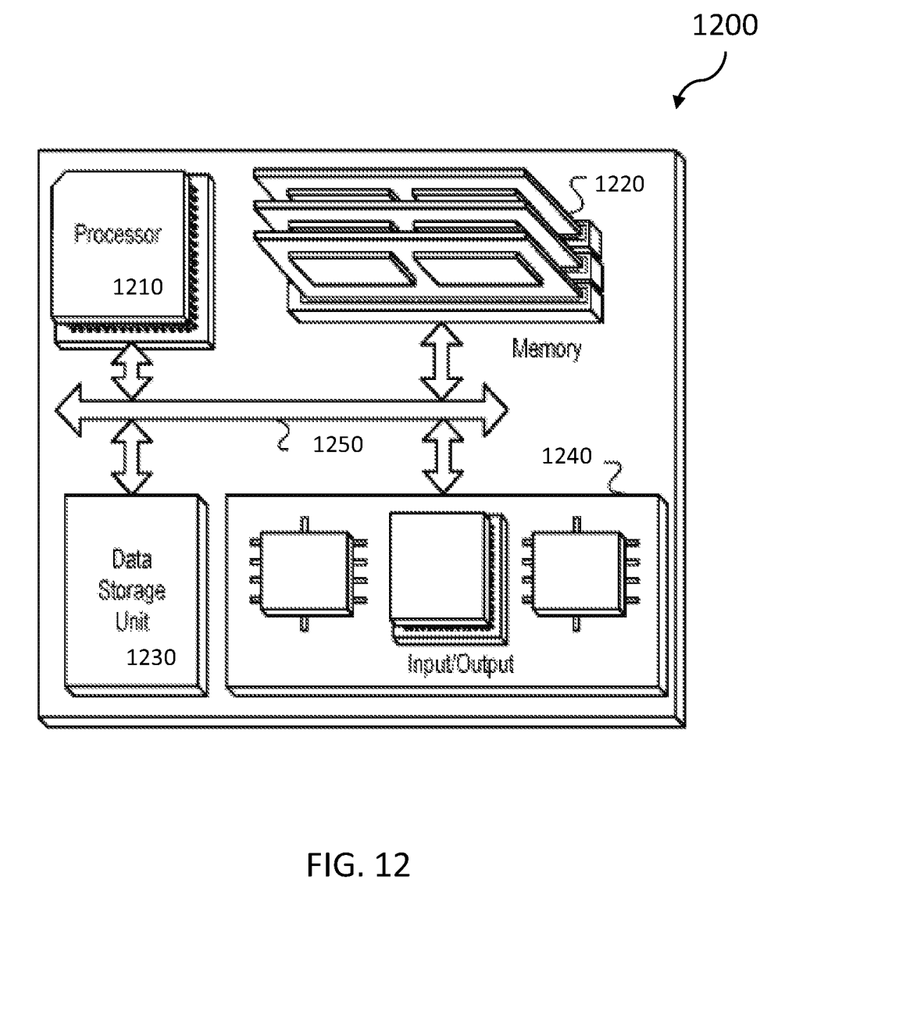
FIG. 12 illustrates a computer system for providing time-dependent authentication in accordance with implementations of various techniques described herein.

FIG. 12 is a block diagram of a hardware configuration 1200 operable to provide time dependent authentication. The hardware configuration 1200 can include a processor 1210, a memory 1220, a storage device 1230, and an input/output device 1240. Each of the components 1210, 1220, 1230, and 1240 can, for example, be interconnected using a system bus 1250. The processor 1210 can be capable of processing instructions for execution within the hardware configuration 1200. In one implementation, the processor 1210 can be a single-threaded processor. In another implementation, the processor 1210 can be a multi-threaded processor. The processor 1210 can be capable of processing instructions stored in the memory 1220 or on the storage device 1230.

The memory 1220 can store information within the hardware configuration 1200. In one implementation, the memory 1220 can be a computer-readable medium. In one implementation, the memory 1220 can be a volatile memory unit. In another implementation, the memory 1220 can be a non-volatile memory unit.

In some implementations, the storage device 1230 can be capable of providing mass storage for the hardware configuration 1200. In one implementation, the storage device 1230 can be a computer-readable medium. In various different implementations, the storage device 1230 can, for example, include a hard disk device/drive, an optical disk device, flash memory or some other large capacity storage device. In other implementations, the storage device 1230 can be a device external to the hardware configuration 1200. The input/output device 1240 provides input/output operations for the hardware configuration 1200.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

Described herein are implementations of various technologies for providing time-dependent authentication of a sending device. A message to a designated receiver is prepared. A portion of at least one secret identifier value of the sending device is retrieved. A portion of time information is retrieved. An authentication field is produced using the portion of the at least one secret identifier value and the portion of the time information. The authentication field is attached to the message. The message is transmitted to the designated receiver.

In one implementation, the portion of time information may be generated by a time generator of the sending device. In one implementation, the time generator of the designated receiver may be operable to generate time information sufficiently precise enough to enable the designated receiver to verify the authentication field when the portion of time information of the time generator of the sending device and a portion of time information generated by a time generator of the designated receiver are not identical.

In one implementation, the sending device may be a user equipment of a mobile network and the designated receiver may be a network device.

In one implementation, the sending device may be a voice over Internet protocol device and the designated receiver may be a network device.

In one implementation, the portion of the at least one secret identifier may be mobile identity information.

Described herein are implementations of various technologies for providing time-dependent authentication of a sending device by a designated receiver. A message is received from the sending device. Sending device information is extracted from the received message. The sending device information includes at least a first authentication field received from the sending device. A portion of at least one secret identifier value of the sending device is retrieved from the designated receiver. A portion of time information is retrieved from the designated receiver. A second authentication field is produced using the portion of the at least one secret identifier value retrieved from the designated receiver and the portion of the time information retrieved from the designated receiver. The first authentication field is compared to the second authentication field. An authentication status indication is provided for the received message based on the comparison.

In one implementation, the portion of time information may be generated by a time generator of the designated receiver. In one implementation, the time generator of the designated receiver may be operable to generate time information sufficiently precise enough to enable the designated receiver to provide the authentication status indication when a portion of time information of the time generator of the sending device and the portion of time information of the designated receiver are not identical.

In one implementation, the sending device and the designated receiver may be part of a mobile network.

In one implementation, the authentication status indicator can validate caller identification information from the sending device.

In one implementation, the portion of the at least one secret identifier value may include one or more of a portion of an IMEI, a portion of an IMES identifier, a portion of an ESN and/or a portion of a MEID.

In one implementation, the sending device and the designated receiver may be part of a social media network. In one implementation, the authentication status indicator may validate sent and/or posted messages.

In one implementation, the sending device and the designated receiver may be part of an Internet of Things (IoT) network. The sending device may be an IoT device and the designated receiver may be a remote device. The portion of the at least one secret identifier value may include identity information known to the IoT device and the remote device.

In one implementation, the second authentication field may be produced using the at least one secret identifier value, the time information, and the message.

In one implementation, the portion of the at least one secret identifier value of the sending device may be retrieved from a device directory of the designated receiver.

Described herein is an apparatus including a device configured to: prepare a message to a designated receiver; retrieve a portion of at least one secret identifier value of the device; retrieve a portion of time information; produce an authentication field using the portion of the at least one secret identifier value and the portion of the time information; attach the authentication field to the message; and transmit the message to the designated receiver.

Described herein is an apparatus including a designated receiver configured to: receive a message from a sending device; extract sending device information from the received message, the sending device information including at least a first authentication field received from the sending device; retrieve a portion of at least one secret identifier value of the sending device from the designated receiver; retrieve a portion of time information from the designated receiver; produce a second authentication field using the portion of the at least one secret identifier value retrieved from the designated receiver and the portion of the time information retrieved from the designated receiver; compare the first authentication field to the second authentication field; and provide an authentication status indication for the received message based on the comparison.

Described herein is a system including a sending device and a designated receiver. The sending device is configured to: prepare a message to a designated receiver; retrieve a portion of at least one first secret identifier value of the sending device; retrieve a portion of first time information; produce a first authentication field using the portion of the at least one first secret identifier value and the portion of the first time information; attach the first authentication field to the message; and transmit the message to the designated receiver. The designated receiver is configured to: receive the message from the sending device; extract sending device information from the received message, the sending device information including at least the first authentication field received from the sending device; retrieve a portion of at least one second secret identifier value of the sending device from the designated receiver; retrieve a portion of second time information from the designated receiver; produce a second authentication field using the portion of the at least one second secret identifier value retrieved from the designated receiver and the portion of the second time information retrieved from the designated receiver; compare the first authentication field to the second authentication field; and provide an authentication status indication for the received message based on the comparison.

The discussion of the present disclosure is directed to certain specific implementations. It should be understood that the discussion of the present disclosure is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of the implementations and combinations of elements of different implementations within the scope of the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort maybe complex and time consuming, but would nevertheless be a routine undertaking of design, fabrication, and manufacture for those of ordinary skill having benefit of this disclosure. Nothing in this application should be considered critical or essential to the claimed subject matter unless explicitly indicated as being "critical" or "essential."

Reference has been made in detail to various implementations, examples of which are illustrated in the accompanying drawings and figures. In the following detailed description, numerous specific details are set forth to provide a thorough understanding of the present disclosure. However, the present disclosure may be practiced without these specific details. In other instances, well-known methods, procedures, components, circuits and networks have not been described in detail so as not to unnecessarily obscure aspects of the embodiments.

It should also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations and is not intended to limit the present disclosure. As used in the description of the present disclosure and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing time-dependent authentication of a sending device, comprising:
   preparing a message to a designated receiver;
   retrieving a portion of at least one secret identifier value of the sending device;
   retrieving a portion of time information, wherein the time information includes a timestamp corresponding to a time generated by a time generator of the sending device;
   producing an authentication field using the portion of the at least one secret identifier value and the portion of the time information;
   encrypting the authentication field by applying a hash function to the portion of the at least one secret identifier value and the portion of the time information, wherein:
      the encrypted authentication field is configured to be compared by the designated receiver to a second encrypted authentication field generated by the designated receiver;
      the encrypted authentication field includes the portion of time information generated by the time generator of the sending device; and
      the second encrypted authentication field includes a portion of time information generated by a time generator of the designated receiver;
   attaching the encrypted authentication field to the message; and
   transmitting the message with the attached encrypted authentication field to the designated receiver.

2. The method of claim 1, wherein the time generator of the sending device is updated by the designated receiver at regular time intervals.

3. The method of claim 2, wherein the time generator of the designated receiver is operable to generate time information sufficiently precise enough to enable the designated receiver to verify the authentication field when the portion of time information of the time generator of the sending device and a portion of time information generated by a time generator of the designated receiver are not identical.

4. The method of claim 1, wherein the sending device comprises a user equipment of a mobile network and the designated receiver comprises a network device.

5. The method of claim 1, wherein the sending device comprises a voice over Internet protocol device and the designated receiver comprises a network device.

6. A method for providing time-dependent authentication of a sending device by a designated receiver, comprising:
receiving a message having an attached first encrypted authentication field from the sending device;
extracting sending device information from the received message, the sending device information including at least the first encrypted authentication field received from the sending device;
retrieving a portion of at least one secret identifier value of the sending device from the designated receiver;
retrieving a portion of time information from the designated receiver, wherein the time information includes a timestamp corresponding to a time generated by a time generator;
producing a second encrypted authentication field by applying a hash function used by the sending device to the portion of the at least one secret identifier value retrieved from the designated receiver and the portion of the time information retrieved from the designated receiver;
comparing the first encrypted authentication field to the second encrypted authentication field, wherein:
the first encrypted authentication field includes a portion of time information generated by a time generator of the sending device; and
the second encrypted authentication field includes the portion of time information generated by the time generator of the designated receiver; and
providing an authentication status indication for the received message based on the comparison.

7. The method of claim 6, wherein the portion of time information is generated by the time generator of the designated receiver.

8. The method of claim 7, wherein the time generator of the designated receiver is operable to generate time information sufficiently precise enough to enable the designated receiver to provide the authentication status indication when a portion of time information of the time generator of the sending device and the portion of time information of the designated receiver are not identical.

9. The method of claim 6, wherein the sending device and the designated receiver are part of a mobile network.

10. The method of claim 9, wherein the authentication status indicator validates caller identification information from the sending device.

11. The method of claim 6, wherein the sending device and the designated receiver are part of a social media network.

12. The method of claim 11, wherein the authentication status indicator validates sent and/or posted messages.

13. The method of claim 6, wherein the sending device and the designated receiver are part of an Internet of Things (IoT) network.

14. The method of claim 13, wherein the sending device comprises an IoT device and the designated receiver comprises a remote device.

15. The method of claim 14, wherein the portion of the at least one secret identifier value includes identity information known to the IoT device and the remote device.

16. The method of claim 6, wherein the second encrypted authentication field is produced using the at least one secret identifier value, the time information, and the message.

17. The method of claim 6, wherein the portion of the at least one secret identifier value of the sending device is retrieved from a device directory of the designated receiver.

18. An apparatus, comprising:
a device, configured to:
prepare a message to a designated receiver;
retrieve a portion of at least one secret identifier value of the device;
retrieve a portion of time information, wherein the time information includes a timestamp corresponding to a time generated by a time generator of the sending device;
produce an authentication field using the portion of the at least one secret identifier value and the portion of the time information;
encrypt the authentication field by applying a hash function to the portion of the at least one secret identifier value and the portion of the time information, wherein:
the encrypted authentication field is configured to be compared, by the designated receiver to a second encrypted authentication field generated by the designated receiver;
the encrypted authentication field includes the portion of time information generated by the time generator of the sending device; and
the second encrypted authentication field includes a portion of time information generated by a time generator of the designated receiver;
attach the encrypted authentication field to the message; and
transmit the message with the attached encrypted authentication field to the designated receiver.

19. An apparatus, comprising:
a designated receiver configured to:
receive a message having an attached first encrypted authentication field from a sending device;
extract sending device information from the received message, the sending device information including at least the first encrypted authentication field received from the sending device;
retrieve a portion of at least one secret identifier value of the sending device from the designated receiver;
retrieve a portion of time information from the designated receiver, wherein the time information includes a timestamp corresponding to a time generated by a time generator of the sending device;
produce a second encrypted authentication field by applying a hash function used by the sending device to the portion of the at least one secret identifier value retrieved from the designated receiver and the portion of the time information retrieved from the designated receiver;
compare the first encrypted authentication field to the second encrypted authentication field, wherein:
the first encrypted authentication field includes a portion of time information generated by a time generator of the sending device; and
the second encrypted authentication field includes the portion of time information generated by the time generator of the designated receiver; and
provide an authentication status indication for the received message based on the comparison.

20. A system, comprising:
a sending device, configured to:
prepare a message to a designated receiver;
retrieve a portion of at least one first secret identifier value of the sending device;
retrieve a portion of first time information, wherein the time information includes a timestamp corresponding to a time generated by a time generator of the sending device;

produce a first authentication field using the portion of the at least one first secret identifier value and the portion of the first time information;
encrypt the first authentication field;
attach the encrypted first authentication field to the message; and
transmit the message with the attached encrypted first authentication field to the designated receiver; and a designated receiver configured to:
receive the message having the attached encrypted first authentication field from the sending device;
extract sending device information from the received message, the sending device information including at least the encrypted first authentication field received from the sending device;
retrieve a portion of at least one second secret identifier value of the sending device from the designated receiver;
retrieve a portion of second time information from the designated receiver;
produce an encrypted second authentication field using the portion of the at least one second secret identifier value retrieved from the designated receiver and the portion of the second time information retrieved from the designated receiver;
compare the encrypted first authentication field to the encrypted second authentication field; and
provide an authentication status indication for the received message based on the comparison.

* * * * *